United States Patent
Bachhofer et al.

Patent Number: 5,256,307
Date of Patent: Oct. 26, 1993

[54] METHOD OF PROCESSING WATER, IN PARTICULAR BATH WATER

[76] Inventors: Bruno Bachhofer, Saentisstrasse 85; Anton Locher, Bergstrasse 6, both of 7980 Ravensburg 1, Fed. Rep. of Germany

[21] Appl. No.: 773,864
[22] PCT Filed: Apr. 21, 1990
[86] PCT No.: PCT/DE90/00296
§ 371 Date: Oct. 24, 1991
§ 102(e) Date: Oct. 24, 1991
[87] PCT Pub. No.: WO90/13520
PCT Pub. Date: Nov. 15, 1990

[30] Foreign Application Priority Data
Apr. 28, 1989 [DE] Fed. Rep. of Germany ....... 3914024

[51] Int. Cl.$^5$ ................................................. C02F 1/52
[52] U.S. Cl. ................................... 210/709; 210/712; 210/721; 210/723; 210/726; 210/746; 210/752; 210/754; 210/760; 252/175; 252/181
[58] Field of Search ............... 210/709, 712, 716, 721, 210/726, 746, 754, 760, 96.1, 192, 764, 752, 723, 724; 252/175, 181

[56] References Cited

U.S. PATENT DOCUMENTS

| | | | |
|---|---|---|---|
| 3,139,402 | 6/1964 | Armbrust | 210/721 |
| 4,053,403 | 10/1977 | Bachhofer et al. | 210/754 |
| 4,385,973 | 5/1983 | Reis et al. | 210/746 |
| 5,130,033 | 7/1992 | Thornhill | 210/760 |

FOREIGN PATENT DOCUMENTS

| | | | |
|---|---|---|---|
| 0027278 | 4/1981 | European Pat. Off. | |
| 0237793 | 9/1987 | European Pat. Off. | |
| 2427526 | 12/1975 | Fed. Rep. of Germany | 210/760 |
| 2450731 | 4/1976 | Fed. Rep. of Germany | |
| 2848178 | 5/1980 | Fed. Rep. of Germany | |
| 3344275 | 6/1985 | Fed. Rep. of Germany | 210/709 |
| 3830999 | 3/1990 | Fed. Rep. of Germany | 210/760 |
| 8115809 | 2/1983 | France | |
| 7111131 | 2/1972 | Netherlands | 210/754 |

OTHER PUBLICATIONS

"Wasser-Aufbereitung mit dem Ozon-Oxidator", Hydro-Elektrik GmbH, Angelesstrasse 50, W-7980 Ravensburg 19, 1985, pp. 34, 72 and 64; examples 1 and 4.

Primary Examiner—Peter Hruskoci
Attorney, Agent, or Firm—Spencer, Frank & Schneider

[57] ABSTRACT

Method of processing water including bath water and water employed in air treatment plants, which is conveyed in a circuit containing a contaminating point and a processing plant, the water exiting the contaminating point being contaminated water having a redox potential which is measurable and the method including, in the order recited, continuously measuring the redox potential of the contaminated water at the inlet of the processing plant; introducing into the contaminated water an auxiliary processing agent which is a mixture including a flocculating agent which promotes deposition of corpuscular pollutants and a halide which reduces ozone and disinfects the contaminated water as a function of the redox potential in such a way that the auxiliary processing agent is introduced in proportion to a drop in the redox potential; treating the water with ozone from an ozone generator in a spatial region defined within the processing plant and forming flocks including the corpuscular pollutants; and filtering the water to remove the flocks, wherein the auxiliary processing agent is introduced in one of the spatial region or upstream of the spatial region.

12 Claims, 1 Drawing Sheet

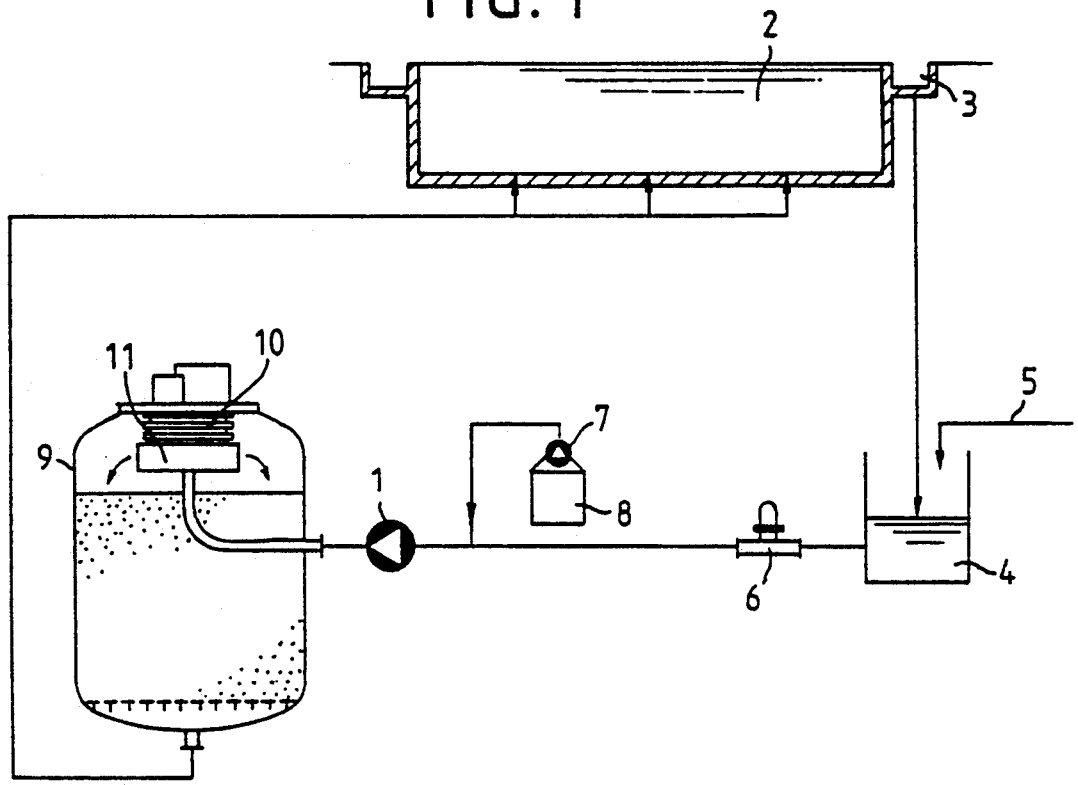
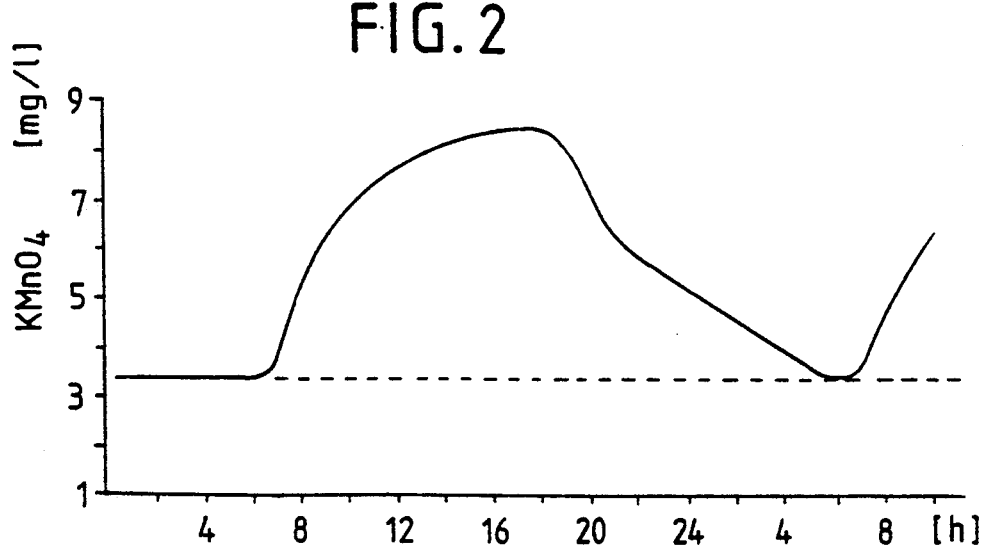

METHOD OF PROCESSING WATER, IN PARTICULAR BATH WATER

BACKGROUND OF THE INVENTION

1. Field of the Invention

The invention relates to a method of processing circulated water, in particular bath water and water in air treatment plants, the water being treated with ozone, filtered and mixed with a flocculant and an ozone-reducing halogen, in particular bromine and/or iodine.

2. Background of the Art

A known method of this type is shown diagrammatically as Example 4 on page 64 in the company publication "Wasser-Aufbereitung mit dem Ozon-Oxidator" ("Water Processing with the Ozone Oxidizer") of Hydro-Elektrik GmbH, Angelestraβe 50, D-7980 Ravensburg 19, from 1985. The flocculant is introduced into the water in the flow direction upstream of the sand filter by means of a metering pump in regular bursts or continuously. In the automatic mode, the metering pump is switched on for as long as the water circulating pump is running. In the filter, the entire flocculant introduced is retained, together with the corpuscular particles bound by its action. Then the water is treated with ozone in the reaction vessel of a treatment plant and then flows back into the pool. Hydrogen bromide is added once to the water as halogen when the pool is first filled. The chosen bromine content then remains practically constant. Only when a part of the water has been supplemented by fresh water, for example the part used for back-flushing the filter, is the hydrogen bromide topped up accordingly.

A disadvantage is that the chemical auxiliary processing agents are introduced into the water regardless of the actual requirement. Specifically, whereas the pollution of the water changes continuously, for example as a result of the organic substances of every kind introduced irregularly by new bathers arriving, the metering of the auxiliary processing agents remains constant. The set values correspond to the maximum pollution to be expected and are therefore too high in normal operation. For example, flocculant added in excess results in an increase in the filter resistance or even in filter blockage and necessitates premature filter back-flushing. However, this requires an unnecessary consumption of fresh water and pollutes the waste water system.

The bromide present in the water is known to react with ozone according to the equation $$O_3 + Br^- = O_2 + BrO^-.$$

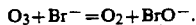

In this process, hypobromite ($BrO^-$) and presumably also higher-valency unstable bromine oxides such as, for example, $BrO_2$ and $BrO_3$, which act as disinfectants and are accompanied by high redox potentials are produced. However, it has been found that both too high and too low redox potentials are disadvantageous.

The object of the invention is to propose a method which rapidly degrades the organic pollution and guarantees an always perfect chemico-physical and hygienic quality of the circulated water with minimum addition of auxiliary processing agents. In addition, the method to be proposed should not only fulfil the applicable standards and regulations relating to the water quality, but should at the same time take into consideration tightened standards and environmental regulations to be expected. These include, in particular, the reduction of the concentration of trihalomethanes (THM) in the bath water to values below 0.01 mg/l.

SUMMARY OF THE INVENTION

Starting from the method described in the introduction, it is proposed according to the invention to achieve this object by controlling the introduction of the auxiliary processing agents, in particular the flocculant and the halogen, as a function of the redox potential of the untreated water.

The redox potential of the untreated water, measured in the return from the contamination point, is a reliably measurable parameter for the microbe-killing capacity of the circulated water. A drop in the redox potential curve always indicates a too low content of disinfectant in relation to the instantaneous water pollution. Coupling the amount of added flocculant and/or halogen to this parameter in the sense that these auxiliary processing agents are only added if the redox potential drops or is below a specified switching level limits the consumption of chemicals to the required minimum. The addition takes place only when required. The flocculant promotes the deposition of corpuscular pollutants. The replenishing of bromide or iodide with exposure to ozone also produces more $BrO^-$ or $IO^-$ and thus eliminates the deficiency of disinfectant. According to the latest discoveries, it may even be advantageous to continue to add auxiliary processing agents for a certain time if the redox potential rises even after the switching threshold has been exceeded and with the ozone generator shut down in order to delay the rise in redox potential.

Experience shows that the convergence with bromine and/or iodine in the water considerably improves the colloid-forming action of the flocculant. At the same time, it appears to be of particular importance that the convergence of these substances takes place in the oxidation region, i.e. in that spatial region of the water conveyance in which the ozone is mixed with the water and reacts with its constituents. It is therefore proposed that the auxiliary processing agents are introduced in the oxidation region or upstream of the oxidation region in the flow direction. This then also means at the same time that the flocks are not filtered off upstream of the ozone treatment plant but downstream of it. The filter is therefore preferably to be disposed downstream of the ozone generator or the mixer in the flow direction. The achievable acceleration in the degradation of the organic pollution is amazing. In experiments, comparable results were achieved in 1/10 of the time needed hitherto.

It has furthermore advantageously been found that it is possible, even if hypobromite and/or hypoiodite is used as disinfectant, to reduce the content of trihalomethanes, in particular of tribromomethane ($CHBr_3$) very considerably and even to keep it below 0.01 mg/l if a redox potential of at least 775 mV is maintained with water temperature-controlled to 28° C.

A further advantage of the invention is the considerable reduction in the turbidity values of the processed water. Thus, for example, in a practical experiment, the turbidity of the pure water did not exceed the amazingly low FNU value of 0.02 after ten hours of bath operation, i.e. the turbidity fell to 1/10 of the value specified according to DIN 19 643.

In order to link the introduction of flocculant and halogen into the water particularly effectively to the requirement, it may be advantageous to make the individual added amounts per unit time variable and dependent on the instantaneous value of the redox potential. For example, a control system can be provided which brings about the result that the added amounts become smaller with increasing redox potential. Preferably, the individual auxiliary processing agents are added to the water in a constant quantitative ratio to one another. It is particularly beneficial if the quantitative ratio of the active substances $Al_2O_3$ and $Br^-$ are approximately in a range from 1:0.3 to 1:1.

The constant quantitative ratio is achieved in the simplest way in that a previously prepared mixture of a plurality of auxiliary processing agents, in particular a mixture of a flocculant and a halogen compound, is introduced into the water. This results, on the one hand, in considerable advantages in storing the mixture, which is not classifiable as a hazardous material. The mixture can be introduced with a single metering pump and consequently with a considerable reduction in the equipment complexity. In addition, the operating reliability is increased at the same time insofar as the mixture does not tend to crystallize out, and consequently, malfunctions due to encrustation of the valves and pumps are eliminated.

In particular, a suitable control system is a measured-value processing system with good resolution, for example a memory-programmable control. For this purpose, it is furthermore proposed that the treatment of the water with ozone, namely the amount of ozone generated is also controlled as a function of the redox potential, the switching threshold for the ozone treatment being higher than the switching threshold for the introduction of auxiliary processing agent. The optimum operation of the control device furthermore requires a fast-response redox measuring system, which can easily be achieved by the suitable choice of the measuring circuit impedance.

It is proposed that a flocculant based on polyaluminum chloride and alumina ($Al_2O_3$) is used. A halogen compound in the form of sodium bromide is preferably added to this flocculant. A preferred auxiliary agent for the water processing with ozone is a mixture of one part of sodium bromide and five to twenty parts of a commercially available polyaluminum chloride flocculant which has an alumina content of about 10%. It has been found that the flocculant (PAC) has a pH of between 3.0 and 3.2 and that this remains unaltered on adding the NaBr crystals.

BRIEF DESCRIPTION OF THE DRAWING

An exemplary embodiment of the invention is explained in greater detail below with reference to the drawing. In detail, FIG. 1 shows a diagram of a bath water processing plant, and FIG. 2 shows a diagram to explain the mode of operation.

DESCRIPTION OF THE PREFERRED EMBODIMENTS

According to FIG. 1, the water is circulated by means of a pump 1. It enters a bathing pool 2 at the bottom and is fed via the overflow channel 3 of the latter into a regulating tank 4. Here fresh water is fed in if necessary via a pipeline 5. Normally, this fresh water feed line is closed. The regulating tank 4 is followed by a measuring point 6. Here the redox potential of the untreated water is measured. Then a liquid auxiliary processing agent mixture is introduced into the circulating line from a stock container 8 by means of a metering pump 7. The mixture consists of a polyaluminum chloride liquid with a sodium bromide component. Then the water enters a so-called compact plant for ozone treatment via the pump 1, which intensively mixes the additive with the water. The compact plant consists of a filtering container 9 under whose lid an ozone plate generator 10 and a mixer 11 are disposed. The filtering container 9 has a perforated internal bottom and is three-quarters filled with sand. The water emerges at the bottom of the filtering container and flows back to the pool 2.

In the mixer 11, the water, in which flocks have already formed, is intensively mixed with ozone, after which it emerges laterally from the mixer and migrates downwards with considerably reduced flow velocity in the filter bed. The mixer, the space surrounding it in the filtering container and the filter bed itself are described as oxidation region. There the ozone reacts with the organic water constituents and the bromide. The latter is activated to form disinfecting hypobromite, whereas excess ozone is at the same time degraded to form oxygen. The presence of bromide and ozone increases the action of the flocculant.

The maximum degree of processing performance achieved is shown by FIG. 2, in which the $KMnO_4$ demand is quoted in mg/l against the time in hours. The water processing plant is designed, in accordance with standard criteria, for four new bathers arriving per hour. The diagram according to FIG. 2 shows, however, a bathing operation with six new people arriving per hour, that is to say 150% pollution of the bathing water from 7.00 to 17.00 hours. The pool is first filled with fresh water which contains dissolved organic substances corresponding to a $KMnO_4$ demand of 3.2 mg/l. After opening the bath at 7.00 hours, the $KMnO_4$ demand increases and decreases steadily again after the bath is closed at 18.00 hours until the initial value is reached. This shows that the total man-made contamination has been eliminated by the processing method. In addition, the THM content at no time exceeds 0.01 mg/l and the free bromine content at no time exceeds 0.5 mg/l. The bromine content is consequently reduced to 1/10 of the value hitherto considered necessary.

Two examples are given of the composition of the auxiliary processing agent mixture, the control of its metering and the control of the ozone generator.

EXAMPLE I

The liquid auxiliary processing agent mixture consists of nine parts of a polyaluminum chloride liquid having an $Al_2O_3$ content of 10.32% and one part of sodium bromide. This corresponds to an $Al_2O_3$:$Br^-$ active substance ratio of about 10:3.

The metered amount per unit time with the metering device running is, on average, constant, i.e. the strokes and the time intervals between the strokes remain unaltered.

Two switching thresholds, namely for the ozone generator, on the one hand, and for the metering pump, on the other hand, are provided. Each switching threshold has an upper and a lower limit value of the redox potential. The limit values for controlling the ozone generator are 800 mV and 790 mV, and the limit values for controlling the metering pump are 775 mV and 765 mV.

The plant operates as follows: starting from a low redox potential, i.e. lying below the limit value of 765 mV, at the beginning of the processing operation, the ozone generator and the metering pump are switched on. When the redox potential of 775 mV is reached, the metering pump is switched off. Provided still no additional organic pollution occurs, the redox potential rises further, since fresh hypobromite is produced repeatedly by the ozone treatment. When 800 mV is reached, the ozone generator is also switched off. If the redox potential then drops below 790 mV as a result of the pollution of the water during bath operation, the ozone generator is first switched on, and in the event of a further drop (as a consequence of serious pollution despite ozone treatment), the metering pump is also switched on again at 765 mV.

EXAMPLE II

Therapy baths having a pool content of 30 m³ which is circulated once in about one hour.

The liquid auxiliary processing agent is mixed from polyaluminum chloride and sodium bromide in such a way that an $Al_2O_3:Br^-$ active substance ratio of about 1:1 is produced.

The metered amount per time of the metering pump is controlled by altering the intervals between the individual strokes as a function of the redox potential. At a low redox potential of <750 mV, the mean metered amount is 1 ml/m³ of the amount of circulated water. Starting from 750 mV, the metered amount drops with increasing redox potential, at first to a greater extent and then more slowly in order to reach the value of 0.2 ml/m³ at about 840 mV. Intermediate values are 0.69 ml/m³ at 760 mV, 0.53 ml/m³ at 770 mV and 0.36 ml/m³ at 790 mV.

In this example, only a single switching threshold with redox potential limit values of 800 mV and 790 mV is provided. If the redox potential drops below this threshold, the ozone generator and the metering pump are switched on together. If the redox potential then rises above the threshold, the ozone generator is switched off, but the metering pump still continues to run for a specified time, for example 30 min., under the control of its own run-on device. Then the metering pump is also shut down, provided the redox potential has not dropped below the threshold again in the meantime.

It has been found that the redox potential still retains very high values for a fairly long time even after the ozone generator has been switched off. This is probably due to a fairly large proportion of higher-valency bromine oxides. The time-limited further metering of flocculant and bromide without ozone (run-on) favours the return of these higher-valency bromine oxides to the monovalent form and consequently the reduction of the redox potential overshoot to a desirable level.

In total, less flocculant and halogen are introduced into the water in relation to the pool size and the operating time according to this example than in the previous example.

What is claimed is:

1. Method of processing water including bath water and water employed in air treatment plants, which is conveyed in a circuit containing a contaminating point and a processing plant, the water exiting the contaminating point being contaminated water and having a redox potential which is measurable and the method comprising, in the order recited:

(a) continuously measuring the redox potential of the contaminated water at the inlet of the processing plant;
(b) introducing into the contaminated water an auxiliary processing agent which is a mixture comprised of a flocculating agent which promotes deposition of corpuscular pollutants and a halide which reduces ozone and disinfects the contaminated water as a function of the redox potential in such a way that the auxiliary processing agent is introduced in proportion to a drop in the redox potential;
(c) treating the water with ozone from an ozone generator in a spatial region defined within the processing plant and forming flocks including the corpuscular pollutants; and
(d) filtering the water to remove the flocks,
wherein the auxiliary processing agent is introduced in one of the spatial region or upstream of the spatial region.

2. The method according to claim 1, wherein a redox potential is preselected as a switching threshold for the introduction of the auxiliary processing agent, and wherein the auxiliary processing agent is added as long as the redox potential is measured to be below the switching threshold for the introduction of the auxiliary processing agent.

3. The method according to claim 2, wherein the auxiliary processing agent continues to be added for a specified time after the redox potential has risen above the switching threshold for the introduction of the auxiliary processing agent, and wherein the ozone generator is shut down during said specified time.

4. The method according to claim 1, wherein the auxiliary processing agent is introduced in proportion to a drop in the redox potential in an amount added per unit of time which depends on the instantaneous value of the redox potential.

5. The method according to claim 4, wherein the amount of auxiliary processing agent added is reduced as the redox potential increases.

6. The method according to claim 1, wherein the flocculating agent and the halide are added to the water in a quantitative ratio to one another which is constant.

7. The method according to claim 6, wherein the flocculating agent is a polyaluminum chloride flocculant containing alumina ($Al_2O_3$) and the halide is Br, and wherein $Al_2O_3$ and Br are added in a weight ratio ranging between about 1:0.3 to about 1:1.

8. The method according to claim 6, wherein the auxiliary processing agent is added as a previously prepared mixture.

9. The method according to claim 1, wherein the ozone generated for treatment of the water is generated in an amount as a function of the redox potential, wherein a second redox potential is preselected as a switching threshold for the ozone treatment, and wherein the threshold switching for the ozone treatment is at a higher redox potential than the switching threshold for the introduction of the auxiliary processing agent.

10. The method according to claim 1, wherein the flocculating agent is polyaluminum chloride and alumina ($Al_2O_3$).

11. The method according to claim 10, wherein the halide is sodium bromide.

12. An auxiliary processing agent for water processing with ozone, comprising:
a mixture of one part by weight of sodium bromide (NaBr) and from five to twenty parts by weight of a polyaluminum chloride flocculant (PAC) which has an alumina ($Al_2O_3$) content of about 10% by weight.

* * * * *